United States Patent [19]

Bosnak

[11] Patent Number: 4,554,533

[45] Date of Patent: Nov. 19, 1985

[54] METHOD OF AND APPARATUS FOR THE TESTING OF WARNING SYSTEMS

[75] Inventor: John J. Bosnak, Old Saybrook, Conn.

[73] Assignee: Whelen Engineering Company, Inc., Deep River, Conn.

[21] Appl. No.: 535,579

[22] Filed: Sep. 26, 1983

[51] Int. Cl.⁴ ........................ G08B 29/00; H04M 5/00

[52] U.S. Cl. ............................... 340/514; 340/384 R; 340/405; 340/692; 179/175.1 A; 381/59

[58] Field of Search ............... 340/514, 515, 518, 522, 340/539, 506, 508, 509, 635, 650, 651, 692, 823.06, 825.16, 825.24, 825.25, 384 R, 384 E, 405; 179/175.1 A, 175.2 R, 175.2 C; 381/59, 58, 60

[56] References Cited

U.S. PATENT DOCUMENTS

| | | | |
|---|---|---|---|
| Re. 29,580 | 3/1978 | Goodwater | 340/514 |
| 3,989,908 | 11/1976 | Budrys et al. | 179/175.1 A |
| 4,037,222 | 7/1977 | Solomon | 179/175.1 A |
| 4,065,647 | 12/1977 | Frye et al. | 179/175.1 A |
| 4,374,435 | 2/1983 | Lach et al. | 179/175.1 A |

*Primary Examiner*—Donnie L. Crosland

[57] ABSTRACT

The operational status of a remotely controlled electronic siren is periodically tested, from a command post, without producing audible sound. The test procedure includes energizing the voice coils of the siren loudspeakers with a signal outside of the audible range, sensing whether current flows in the speaker voice coil circuits and storing the results of the test. The stored information, upon request, will be transmitted back to the command post.

20 Claims, 3 Drawing Figures

METHOD OF AND APPARATUS FOR THE TESTING OF WARNING SYSTEMS

BACKGROUND OF THE INVENTION

1. Field of the Invention

The present invention relates to the testing of warning systems, sirens for example, and particularly to a testing technique which does not require the production of audible sound. More specifically, this invention is directed to warning systems, and particularly to systems which include remotely controllable sound transducers which may be tested for operability without the generation of audible sound. Accordingly, the general objects of the present invention are to provide novel and improved methods and apparatus of such character.

2. Description of the Prior Art

While not limited thereto in its utility, the present invention is particularly well-suited for use with and in civil defense systems of the type wherein sound transducers, electronic sirens for example, located at a plurality of remote locations may be selectively energized from a control center. Such systems may, for example, be employed to warn residents of the approach of severe weather. Warning systems of the type being discussed may remain unused for very substantial periods of time but must be maintained in operative condition. In the past, in order to determine the state of operability of the apparatus at a remote siren site it was necessary to energize the individual sound transducer and have an individual listener provide a report as to whether the requisite sound was produced. This mode of testing periodically exposes residents living in the vicinity of each sound transducer to the necessarily unpleasant sound produced thereby and has typically required that the operator of the system have an employee periodically visit each remotely located transducer to cause and/or observe the energization thereof. Thus, prior art testing procedures were, at best, annoying and inconvenient.

SUMMARY OF THE INVENTION

The present invention overcomes the above-discussed and other deficiencies and disadvantages of the prior art by providing a technique for the testing of electronic sirens which does not require the production of audible sound. The technique of the present invention may be practiced at the sound transducer site or, in the preferred embodiment, remotely from a command station thereby enabling the testing of each sound transducer at regularly selected intervals and regardless of the time of day. The technique of the present invention uses, and thus results in the testing of, substantially all of the components of the remotely controlled siren. The present invention also encompasses apparatus for use in the practice of the aforesaid novel technique and particularly a remotely controllable, self-testing electronic siren system. Apparatus in accordance with a preferred embodiment of the invention has the capability of reporting, upon interrogation, its state of operability and particularly of reporting a plurality of operating parameters.

A remotely controllable sound generator including the present invention will comprise an array of loud speakers, eight or sixteen speakers for example, which are driven by amplifiers having a high output power. In order to maximize the range at which the apparatus will provide a sufficiently loud warning sound, the speakers may be mounted in a rotatable array, i.e., all of the sound generated may be directed over a relatively narrow field and this field "swept" over the desired area by imparting motion to the array through the use of a motor. In a siren mode of operation a signal in the audible frequency range and possessing the appropriate modulation will be applied to the power amplifiers to cause energization of the speakers. This signal will be produced by a tone generator. Both the tone generator and the drive motor for the speaker array will be activated upon receipt of a command signal, the command signal typically being a coded radio frequency transmission which is received and decoded. The command signal will include instructions indicating whether a normal or test mode of operation is desired.

A siren system in accordance with the present invention will include a test module which, in response to receipt of a test command, will institute a testing sequence. This testing sequence includes reconfiguring the tone generator such that it provides an output signal at a frequency which is above the audible frequency range. This "high" frequency output signal will be at a power level which is lower than that produced during "normal" operation. Upon receipt of the "high" frequency test tone, power will be delivered to the speakers but the resulting energization will not result in production of audible sound. The state of energization of each speaker is monitored by means of sensing whether there is current flow to the speaker voice coils. In a preferred embodiment the current sensors associated with the speakers are connected to logic circuitry which generates and stores a signal commensurate with whether there has been current flow in all, some or none of the speaker voice coil circuits.

Also in accordance with a preferred embodiment, wherein an array of movable speakers is employed, the test module will cause the energization of the speaker array drive motor for a short time period. The motor output shaft will be provided with a suitable rotation detector and rotation or the absence of rotation will be detected and stored.

In the case of a remotely located electronic siren, the sound transducer will typically receive its operating power from an alternating current source via a battery, the battery being connected to the AC source by means a battery charger thereby insuring operability in the case of a power failure. Apparatus in accordance with the present invention enables the testing, from a remote location, of the availability of AC power, whether the battery is fully charged and, if desired, the voltage level to which the battery is charged.

The present invention further contemplates the incorporation of a status encoder which, upon receipt of a transmitted status request signal, will provide a coded output signal commensurate with the state of operability of the speakers and motor, as sensed and stored as a result of the operation of the test module, and the state of the AC and DC power sources. This encoded status signal may be transmitted to the command station and/or all or part of the information may be displayed at the test site.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
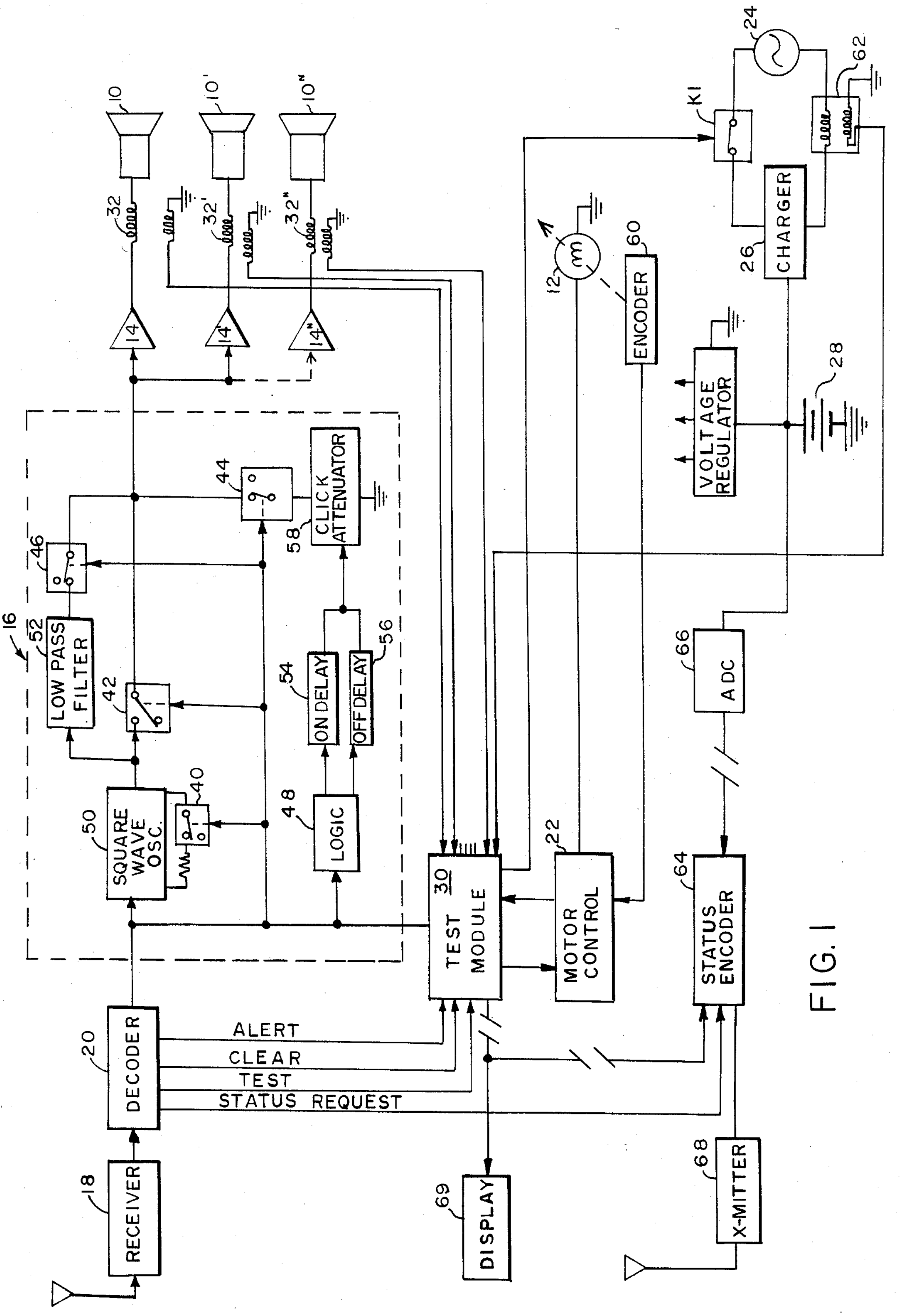
FIG. 1 is a functional block diagram of a remotely controllable electronic siren incorporating the present invention.

While not limited thereto in its utility, the present invention is particularly well-suited for use in a warning system which includes plural, selectively energizable, remotely located electronic sirens. FIG. 1 depicts, in functional block diagram form, one of these remotely located electronic sirens. The siren includes a plurality of loud speakers 10, 10$^{N}$, 10. The speakers 10 will typically be ganged together to define a speaker array which will customarily be supported within a single rotatable housing, not shown. In a typical installation there will be sixteen speakers with the sound generated thereby aimed over a narrow field. The speaker array will be caused to rotate or oscillate by means of a drive motor 12 whereby the generated sound will be swept over an area defined by the degree of rotation and the total output power of the multiple speakers. The speakers 10 will be driven by power amplifiers 14, i.e., the power amplifiers will provide the drive current which is coupled to the speaker voice coils. In a typical case the "normal" input signal to power amplifiers 14 will be an 800 Hz square wave provided by a tone generator which has been indicated generally at 16.

The electronic siren of FIG. 1 is remotely controlled and thus includes a receiver 18 which receives coded RF transmissions from a command station. The demodulated signal appearing at the output of receiver 18 is delivered to a decoder 20. In a typical case the coded signal is eight digits in length, the first three digits being an area code, the next four digits being the address and the last digit being the command. Each remotely located siren, accordingly, may have its own unique address and will be energized only when the first seven bits of transmitted information are commensurate with the code to which decoder 20 has been set and the last bit of transmitted information is an energize command. The energize command, when received, will be delivered to and cause activation of the tone generator 16 and a motor controller 22 to cause motor 12 to begin to rotate the speaker array. De-energization will occur in the same manner with the exception that the last digit or piece of information contained in the transmitted signal will be an "off" command. In one reduction to practice of the invention dual-tone multi-frequency modulation was employed, i.e., the transmitted signal was modulated in a manner similar to that employed in telephone systems which utilize "Touch-Tone" dialing and decoder 20 was of the type employed in such systems. Thus, the RF carrier was, in this reduction to practice, sequentially modulated by eight dual-tone signals, each modulating signal being commensurate with a number, and the decoder converted the dual-tones back to information in binary form.

The electronic siren will typically be supplied with power from battery 28 with the battery being charged from an available alternating current source 24. Source 24 is connected to a conventional battery charger 26 which maintains the requisite charge on battery 28. Alternatively, AC source 24 could be coupled, via a suitable power supply, to the siren with a switching circuit being employed to connect the output of the battery 28 to the siren only when the AC power fails.

As described above, the remotely controllable electronic siren is of a construction generally known in the prior art. Apparatus in accordance with the present invention additionally includes a test module which has been indicated generally at 30 and which will be described in detail below in the discussion of FIG. 2. Test module 30 is connected to the output of decoder 20 and will be energized when the last digit of a transmitted signal addressed to the siren comprises a test command. When a test command is received, and in a sequence which will be discussed below, the test module 30 will provide an output, i.e., a "start" test, signal which will "reconfigure" the tone generator 16 whereby, rather than produce an 800 Hz square wave, a signal at a frequency above the audible range will be generated. In one reduction to practice the output signal of tone generator 16, in the test mode, was a 20 KHz sine wave. This "high" frequency sine wave is applied as the input to power amplifiers 14 whereupon the amplifiers provide drive current to the voice coils of speakers 10. However, while the speakers will be energized, audible sound will not be produced. The primary winding of a current sensing transformer 32 will be connected in series with the voice coil of each of speakers 10. Accordingly, upon energization of speakers 10 a voltage will be induced in the secondary winding of each of transformers 32. These voltages will be delivered as inputs to test module 30 and will be analyzed, in the manner to be described below, by logic circuitry in the test module.

The "start" command provided by test module 30 to tone generator 16 will function to turn on a square wave generator 50 and as the control signal for a plurality of electronic switches 40, 42, 44 and 46. In addition, the "start" command signal will be delivered as an input to a "click" attenuation logic control circuit 48. The square wave generator 50 will be of conventional design. The output frequency of generator 50 may be varied by switching passive circuit components in the oscillator circuit. Accordingly, generator 50 may be caused to produce an output signal at a desired frequency. In the example being described, with switch 40 in a normally open condition, square wave generator 50 will provide an 800 Hz square wave. When switch 40 is closed in response to the "test" command from test module 30 the square wave generator 50 will produce a 20 KHz square wave. Under normal operating conditions, i.e., in other than the "test" mode, switch 42 will be in the closed state and switch 46 will be in the open state. Accordingly, the "low" frequency signal from square wave generator 50 will normally be applied as the input to amplifiers 14. In the test mode, with switch 42 in the open state and switch 46 in the closed state, the "high" frequency signal provided by square wave generator 50 will be delivered to the inputs to amplifiers 14 via a low pass filter 52. Filter 52 will serve to convert the square wave output of generator 50 to a sine wave signal. Accordingly, the average signal level at the input to amplifiers 14, and thus the power delivered to the speaker voice coils, will be reduced in the test mode.

In the mode of operation described above there would, unless additional precautions were taken, be an audible "click" produced by speakers 10 when the test mode was instituted and terminated. In order to eliminate this audible sound the tone generator 16 is provided with the aforementioned switch 44 and a click attenuation circuit which functionally comprises logic circuit 48, delay circuits 54 and 56 and a "click" attenuator 58. Switch 44 is normally open and is closed in response to the "start" command from test module 30. Switch 44 connects the output of filter 52 to ground via the attenuator 58. The "click" attenuator 58 comprises a transistor, which functions as a variable resistance, and an RC network. The logic circuit 48 is defined by exclusive OR's. The click attenuation circuit provides for a smooth transition from the zero to full signal level at the inputs to amplifiers 14 upon initiation of a test and a smooth transition back to the zero level at the conclusion of a test. Thus, when a "start" test signal appears at the input to logic circuit 48 the transistor in attenuator 58 will be turned on, thus shorting the amplifier 14 inputs to ground, and the transistor will subsequently be gradually biased to cut-off over the period determined by delay 54. The opposite action will occur upon termination of the "start" signal.

The test module 30 also provides, in the appropriate time sequence, an "on" command to motor controller 22 whereby motor 12 will be energized and its output shaft will begin to rotate. An encoder 60, which may for example be an optical encoder employing an apertured disc, will be associated with the motor output shaft. Rotation of the motor output shaft, and thus of the speaker array, will accordingly result in encoder 60 providing a "strobe" signal which is fed back to test module 30 via motor controller 22. The disclosed embodiment of the present invention also includes a further current sensor 62, which may include a current sense transformer, for detecting whether current is being supplied from the AC line to battery charger 26. The signal provided by sensor 62 is always present. This AC power status signal is shown as being delivered to the test module 30 but may alternatively be rectified and delivered directly to a status encoder 64. The battery voltage may also be sensed by an analog-to-digital convertor 66. The output of convertor 66 will be a digital signal commensurate with instantaneous battery voltage. In the disclosed embodiment this digital signal is delivered directly to the status encoder 64.

Status encoder 64 will include preset area code and address registers, a binary code to dual-tone multi-frequency convertor and appropriate timing and switching circuitry. The status encoder 64 receives, in the disclosed embodiment, information stored in the test module 30 commensurate with the state of the speakers, i.e., either all or part of the speakers being operational, and the operational state of the motor. Additionally, the state of the AC power source is delivered, either directly or via test module 30, as an input to status encoder 64. Additionally, as discussed above, the binary output of convertor 66 constitutes an eight bit input to status encoder 64. Upon receipt and decoding of a status request command, which will typically be received subsequent to completion of a test mode, the status encoder 64 will provide a dual-tone multi-frequency modulation signal to a transmitter 68. Transmitter 68 will, upon receipt of the status request signal, be enabled and will transmit the status information back to the control station. The transmitted information will be the three digit area code and four digit address of the siren, one digit indicating the status of the speakers, motor and AC power and two digits which are respectfully commensurate with four of the bits of the output of convertor 66. The transmitted information, i.e., the numbers corresponding to the dual-tones which modulate the carrier, will be converted back to binary form at the command station.

The information stored in the test module 30 may, if desired, also be delivered to a display 69 at the siren location. The display 69, if employed, will typically also provide a visual indication of the availability of AC power. Further, display 69, through the use of a voltage sensor, may provide a visual indication of the state of battery 28.

The above-described circuitry will typically be housed in a locked weather-proof enclosure. An additional input to the status encoder 64, which could trigger the operation of transmitter 68, may be a sensor which is responsive to the unauthorized opening of the enclosure.

Figure 2:
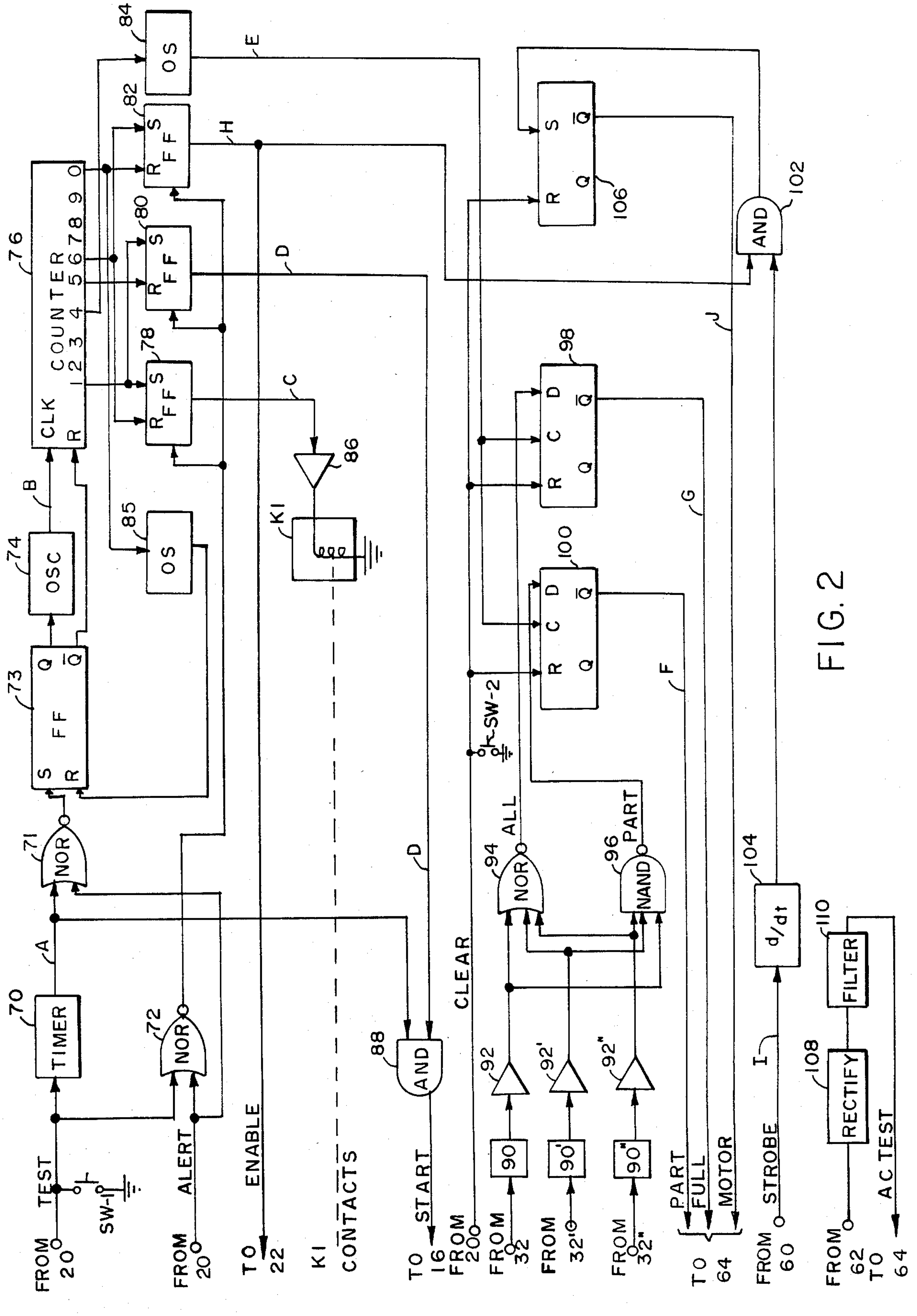
FIG. 2 is a block diagram of the test module of the apparatus of FIG. 1.
Figure 3:
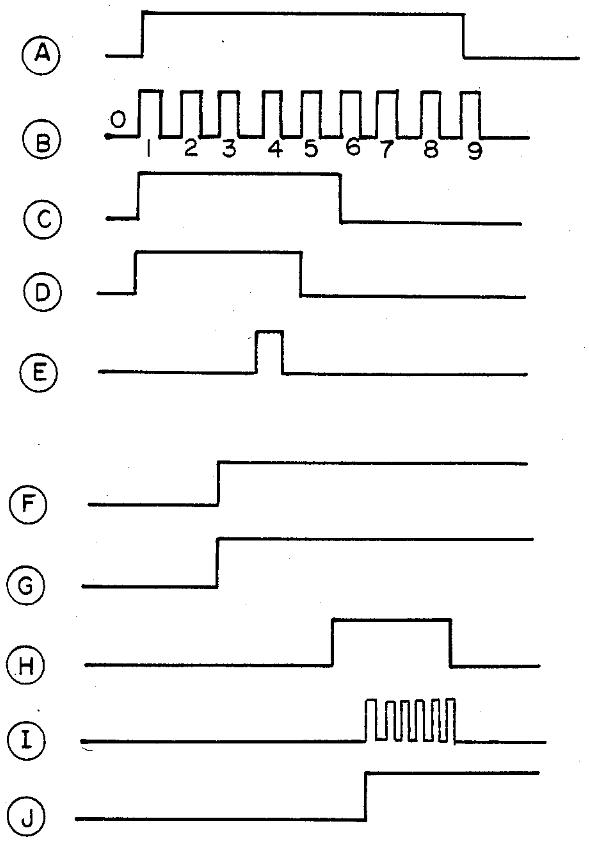
FIG. 3 is a timing diagram which will facilitate the understanding of FIGS. 1 and 2.

Referring now to FIG. 2, the test module 30 is shown in block diagram form. The test sequence is initiated by the momentary grounding of the input to a timer 70. Timer 70 may include an input gate and a type 555 timer which is set by the output of the gate upon receipt of a test command from decoder 20. A switch SW-1 is also provided to permit the test sequence to be initiated manually, closing of switch SW-1 momentarily grounding the input to timer 70. Referring to FIG. 3, timer 70, when energized, provides an output pulse, indicated at "A", of preselected duration. This output pulse is applied as an input to NOR gate 71. The pulse "A", passed by gate 71, sets a flip-flop circuit 73 which, in turn, enables an oscillator 74. Oscillator 74 may also comprise a type 555 timer which, when enabled, will provide a series of output pulses as indicated at "B" on FIG. 3. The output of oscillator 74 is delivered to the "clock" input of a counter 76. Output terminals of counter 76 are connected, as shown, to input terminals of three bi-stable flip-flop circuits 78, 80 and 82 and to the input terminals of one-shot multivibrators 84 and 85. Flip-flop 78 is the "charger disconnect" command signal generator and is set by the "one" output of counter 76. The output of flip-flop 80 determines the speaker test window, indicated at "D" in FIG. 3. Flip-flop 80 is also set by the "one" output of counter 76. The motor test window is determined by the output of flip-flop 82 which is indicated in FIG. 3 at "H". The motor test flip-flop 82 is set by the "six" output of counter 76, this counter output also resetting the charger disconnect flip-flop 78. The one-shot multivibrator 84 is triggered by the "four" output of counter 76 and provides a sampling or clock pulse as indicated at "E" in FIG. 3. One-shot multivibrator 85 is triggered by the "zero" output of counter 76.

The output of flip-flop 78 is delivered as the input to an amplifier 86. Amplifier 86, when gated to the conductive state by the output of the flip-flop 78, will provide energizing current to the coil of a relay K1. The normally closed contacts of relay K1 are, as shown in FIG. 1, connected in series between the AC source 24 and battery charger 26. Accordingly, during the time period when flip-flop 80 is in the set state, i e., during the duration of the signal "C" of FIG. 3, the battery charger will be disconnected from the AC source. It is desired to disconnect charger 26 from the AC source during the testing of the speakers because the 60 Hz "hum" on the DC supply for the siren, as it appears at the output of the battery charger, might be audible. As may be seen from FIG. 3, the speaker test window "D"

comes within the time period "C" that the battery charger is disconnected. The output of flip-flop 80, i.e., the speaker test window, is delivered as a first input signal to an AND gate 88 which provides the "start" command. Gate 88 is enabled by the output of timer 70, signal "A". This "start" command is the control signal for switches 40, 42, 44 and 46 of FIG. 1. Thus, the appearance of the signal "D" at the output of gate 88 will turn tone generator 16 on and will cause its output to be a "high" frequency sine wave. The sampling pulse "E" will be generated by multivibrator 84 during the period that the "high" frequency sine wave is being generated.

The voltages induced in the secondary windings of the current sensing transformers 32 are detected, in rectifiers 90, and amplified in amplifiers 92. The outputs from amplifiers 92 are connected to the inputs of a NOR gate 94 and a NAND gate 96. Gate 96 will, accordingly, provide an output signal when some, but not all, of its inputs are "low". The output of gate 96, accordingly, is indicative that the speaker array is partially operative. The output of gate 96 is delivered to the "D" input to a storage device 100 which may, for example, comprise a D-type flip-flop. Gate 94 will provide an output signal when all of the input signals thereto are "low", i.e., an output from gate 94 will indicate that all of the speakers in the array are operative. The output of gate 94 is delivered as the "D" input to a memory device 98 which will be identical to storage device 100. The sampling pulse from one shot multivibrator 84 is delivered as the clock input to storage devices 98 and 100. Thus, the outputs of storage devices 98 and 100 will, upon receipt of the pulse from one shot 84, be switched so as to provide, at the input to status encoder 64, one of, both or neither of the signals indicated on FIG. 3 at "F" and "G".

In the embodiment being described the motor test will be performed subsequent to the speaker test, i.e., during the motor test window "H". Thus, upon the resetting of flip-flop 80 the tone generator 16 will be disabled. Also, at the next count, i.e., count "five" from counter 76, flip-flop 78 will be reset whereby the battery charger 26 will be reconnected. The motor window signal "H" from flip-flop 82 is delivered as the enabling signal to motor control 22 and is also applied as a first input to an AND gate 102. The second input to gate 102 will be the strobe pulse or pulses "I" provided by encoder 60 when the output shaft of motor 12 rotates, these output pulses being differentiated in a differentiator 104 before being applied as the second input to gate 102. Thus, if a strobe pulse is received from encoder 60 during the motor test window gate 102 will provide an output signal which will set a further storage device 106 which may comprise an RS type flip-flop circuit. The storage device 106 provides the "J" output signal which is commensurate with the results of the motor test.

The output of sensor 62 is rectified, in a rectifier 108, passed through a filter 110 and a DC output signal indicative of the availability of AC power is fed to status encoder 64. This AC power availability signal is present at all times and thus the remote siren system may be interrogated, by means of a status request command, without performing a speaker/motor test sequence, to determine the availability of AC power at the remote siren location.

The storage devices 98, 100 and 106 will be reset by a "clear" signal transmitted from the command station, the "clear" signal appearing as an output of decoder 20.

The flip-flop circuit 73 is reset by the output of one-shot multivibrator 85 at the end of a test cycle, the cycle starting with the first input pulse to counter 76, which produces a "one" output from the counter, and ending with the "zero" count. Resetting of flip-flop 73, in turn, causes the resetting of counter 76 whereby the system will be ready for the next test sequence.

The "TEST" signal appearing at the input to timer 70 is also delivered as a first input to NOR gate 72. The second input to gate 72 is an "ALERT" signal provided by decoder 20. An ALERT command will be transmitted to permit assessing the results of an actual test of the siren, i.e., to test what occurs during normal operation. In the ALERT mode the flip-flop 73 will be set by the ALERT signal passed by gate 71 while flip-flops 78, 80 and 82 will be enabled by a signal passed by gate 72 as in the test mode. In the ALERT mode, however, the timer 70 will not be turned on and thus gate 88 will not be enabled. Accordingly, the system will operate as described above with the exception that the output frequency of the tone generator 16 will not be switched.

It is to be understood that the applicant's invention is not limited to the illustration described and shown herein, which is deemed to be merely illustrative of the best mode of carrying out the invention, and which is susceptible to modification as to form, size, arrangement of parts and details of operation. The invention, rather, is intended to encompass all such modifications which are within its spirit and scope as defined by the appended claims.

What is claimed is:

1. In an electronic siren system, the system including a tone generator and at least a first loudspeaker, the loudspeaker having a voice coil and being responsive to the energization of the tone generator to produce an audible sound commensurate with the output frequency of the tone generator, the improvement comprising:

- means for generating a test command signal
- means responsive to the test command signal for energizing the tone generator and varying the output frequency of the tone generator from the audible range to a frequency above the audible range;
- means for sensing the flow of current at the frequency above the audible range through the loudspeaker voice coil and producing a signal indicative of such current flow; and
- means for storing the signal produced by said sensing means.

2. The apparatus of claim 1 wherein said siren system includes a plurality of loudspeakers responsive to the output of the tone generator, and wherein said improvement further comprises:

- means for sensing the flow of current through the voice coil of each loudspeaker and generating signals commensurate therewith; and
- logic circuit means connected to said sensing means, said logic circuit means providing output signals commensurate with the flow of current through all, some and none of the speaker voice coils, said storing means storing the output signals provided by said logic circuit means.

3. The apparatus of claim 2 wherein the loudspeakers are mounted in a movable housing and said siren system includes a motor for imparting motion to the housing via a drive, and wherein said improvement further comprises:

means responsive to the test command signal for energizing the motor;

means for sensing movement of the motor drive in response to energization of the motor and for providing a signal commensurate therewith; and means connecting said movement sensing means to said storing means, said storing means additionally storing a signal commensurate with the output provided by said movement sensing means during the period of energization of the motor in response to a test command.

4. The apparatus of claim 3 wherein said improvement further comprises:

timer means responsive to said test command signal, said timer means providing control signals to said means responsive to test command signals whereby the motor and loudspeakers may be energized in a desired sequence.

5. The apparatus of claim 1 wherein the siren system includes a source of direct current which receives power from an alternating current supply, and wherein the improvement further comprises:

means for sensing the availability of alternating current and providing a signal commensurate therewith.

6. The apparatus of claim 5 further comprising:

means for sensing the magnitude of the potential of the direct current source and providing a binary signal commensurate therewith.

7. The apparatus of claim 6 further comprising:

means for generating a coded status message; and means coupling said storing means and said alternating current and direct current potential sensing means to said message generating means whereby a coded message indicative of the sensed parameters will be generated.

8. The apparatus of claim 4 wherein the siren system includes a source of direct current which receives power from an alternating current supply, and wherein the improvement further comprises:

means for sensing the availability of alternating current and providing a signal commensurate therewith.

9. The apparatus of claim 8 further comprising:

means for sensing the magnitude of the potential of the direct current source and providing a binary signal commensurate therewith.

10. The apparatus of claim 9 further comprising:

means for generating a coded status message; and means coupling said storing means and said alternating current and direct current potential sensing means to said message generating means whereby a coded message indicative of the sensed parameters will be generated.

11. The apparatus of claim 4 wherein said timer means comprises:

oscillator means, said oscillator means providing a series of output pulses in response to a test command;

counter means connected to said oscillator means and responsive to the pulses provided thereby; said counter means having a plurality of outputs; and bistable circuit means, said bistable circuit means being connected to said counter means outputs and providing control signals of preselected length in a predetermined sequence, said control signals causing energization of the motor and variation of the tone generator output frequency.

12. The apparatus of claim 10 wherein said timer means comprises:

oscillator means, said oscillator means providing a series of output pulses in response to a test command;

counter means connected to said oscillator means and responsive to the pulses provided thereby; said counter means having a plurality of outputs; and bistable circuit means, said bistable circuit means being connected to said counter means outputs and providing control signals of preselected length in a predetermined sequence, said control signals causing energization of the motor and variation of the tone generator output frequency.

13. The apparatus of claim 1 wherein the siren system tone generator includes a square wave oscillator and wherein said means for varying the tone generator output frequency comprises:

means for varying the time constant of the circuit comprising the square wave oscillator; and means for converting the square wave output of the square wave oscillator to substantially a sine wave.

14. The apparatus of claim 4 wherein the siren system tone generator includes a square wave oscillator and wherein said means for varying the tone generator output frequency comprises:

means for varying the time constant of the circuit comprising the square wave oscillator; and means for converting the square wave output of the square wave oscillator to substantially a sine wave.

15. The apparatus of claim 7 wherein the siren system tone generator includes a square wave oscillator and wherein said means for varying the tone generator output frequency comprises:

means for varying the time constant of the circuit comprising the square wave oscillator; and means for converting the square wave output of the square wave oscillator to substantially a sine wave.

16. The apparatus of claim 12 wherein the siren system tone generator includes a square wave oscillator and wherein said means for varying the tone generator output frequency comprises:

means for varying the time constant of the circuit comprising the square wave oscillator; and means for converting the square wave output of the square wave oscillator to substantially a sine wave.

17. The apparatus of claim 13 further comprising:

means for causing the magnitude of said sine wave to increase gradually from zero to its maximum level upon initiation of the loudspeaker test and to decrease gradually from its maximum level to zero upon termination of the loudspeaker test.

18. The apparatus of claim 14 further comprising:

means for causing the magnitude of said sine wave to increase gradually from zero to its maximum level upon initiation of the loudspeaker test and to decrease gradually from its maximum level to zero upon termination of the loudspeaker test.

19. The apparatus of claim 15 further comprising:

means for causing the magnitude of said sine wave to increase gradually from zero to its maximum level upon initiation of the loudspeaker test and to decrease gradually from its maximum level to zero upon termination of the loudspeaker test.

20. The apparatus of claim 16 further comprising:

means for causing the magnitude of said sine wave to increase gradually from zero to its maximum level upon initiation of the loudspeaker test and to decrease gradually from its maximum level to zero upon termination of the loudspeaker test.

* * * * *